United States Patent [19]

Inada

[11] Patent Number: 4,674,433
[45] Date of Patent: Jun. 23, 1987

[54] CORRECT ANSWER DISPLAYING DEVICE FOR ARITHMETIC PRACTICING UNIT

[75] Inventor: Mitate Inada, Tokyo, Japan

[73] Assignee: Kabushiki Kaisha Gakushu Kenkyusha, Tokyo, Japan

[21] Appl. No.: 781,479

[22] Filed: Sep. 30, 1985

[30] Foreign Application Priority Data

Feb. 16, 1985 [JP] Japan .............................. 60-20019[U]

[51] Int. Cl.$^4$ .............................................. G09B 3/00
[52] U.S. Cl. ...................... 116/279; 116/200; 116/312; 116/314; 434/202
[58] Field of Search ...................... 434/202, 209, 348; 116/279, DIG. 28, 310, 311, 312, 313, 314, 321, 323, 324, 283, 200, 281

[56] References Cited

U.S. PATENT DOCUMENTS

| | | | | |
|---|---|---|---|---|
| 2,614,162 | 10/1952 | Smith | ................................... | 116/279 |
| 3,237,591 | 3/1966 | Pichel | ................................... | 116/279 |
| 3,366,765 | 1/1968 | Beale | ................................... | 116/279 |
| 3,855,959 | 12/1974 | Hinze | ................................... | 116/279 |
| 4,258,477 | 3/1981 | Ishiyama | ............................. | 434/202 |

*Primary Examiner*—Charles Frankfort
*Assistant Examiner*—Denis E. Corr
*Attorney, Agent, or Firm*—Finnegan, Henderson Farabow, Garrett and Dunner

[57] ABSTRACT

A correct answer displaying device for an arithmetic practicing device or the like. Plural chambers are arranged in matrix form with partition boards, and a colored transparent plate is placed over the chambers on which numerical problems to be solved are indicated and through which the configurations of the correct answer numbers cannot ordinarily be observed. Answer levers are operated to cause white plates to come near the lower surface of the colored transparent plate to display the correct answers. The white plates are pivotally mounted about one side thereof in which an engaging step is formed. Each answer lever, which has an engaging protrusion engaged with a respective engaging step, is accommodated in a guide frame in such a manner that the answer lever can pass in and out of the corresponding chamber.

4 Claims, 9 Drawing Figures

CORRECT ANSWER DISPLAYING DEVICE FOR ARITHMETIC PRACTICING UNIT

BACKGROUND OF THE INVENTION

The present invention relates to a correct answer displaying device for a manual multiplication practicing unit which uses no electric power.

A conventional correct answer displaying device for a multiplication practicing unit includes blocks arranged in matrix form. In each of the blocks, a plastic, dark-colored transparent plate is provided, on the front surface of which a multiplier, a multiplicand, and the multiplication symbol are indicated and on the rear surface of which is bonded a black sheet punched to show the correct answer. A white plate is disposed below the dark-colored transparent plate with a small space therebetween so that the correct answer can be observed through the dark-colored transparent plate when the learner pushes the block with his finger.

The above-described conventional correct answer displaying device is disadvantageous in that, since the block is pushed with the finger, it is rather difficult to observe the whole correct answer. Moreover, if the device is handled roughly, the restoring elasticity of the dark-colored transparent plate may be reduced.

SUMMARY OF THE INVENTION

Overcoming the above-mentioned difficulties, in a correct answer displaying device of the invention, the colored transparent plate is made of a hard plate, each block is formed into a chamber, and a white plate for displaying a correct answer is provided in the block in such a manner that it is swingable through about 90°. Furthermore, in each chamber, an answer lever engaging with the white plate is provided, constructed and arranged in such a manner as to be able to pass in and out of the chamber so that, when the answer lever is depressed, the white plate is caused to come near the colored transparent plate to allow the learner to observe the correct transparent plate to allow the learner to observe the correct answer through the colored transparent plate.

As is apparent from the above description, according to the invention, it is difficult to observe the correct answer before the answer lever is depressed. However, the correct answer can be clearly observed by depressing the answer lever.

The correct answer displaying device according to the invention is advantageous in that, since the swingable white plate is merely engaged with the answer lever, the device can be assembled readily and operated positively, and the device is made more reliable since the number of components is small.

DESCRIPTION OF THE PREFERRED EMBODIMENTS

Figure 1:
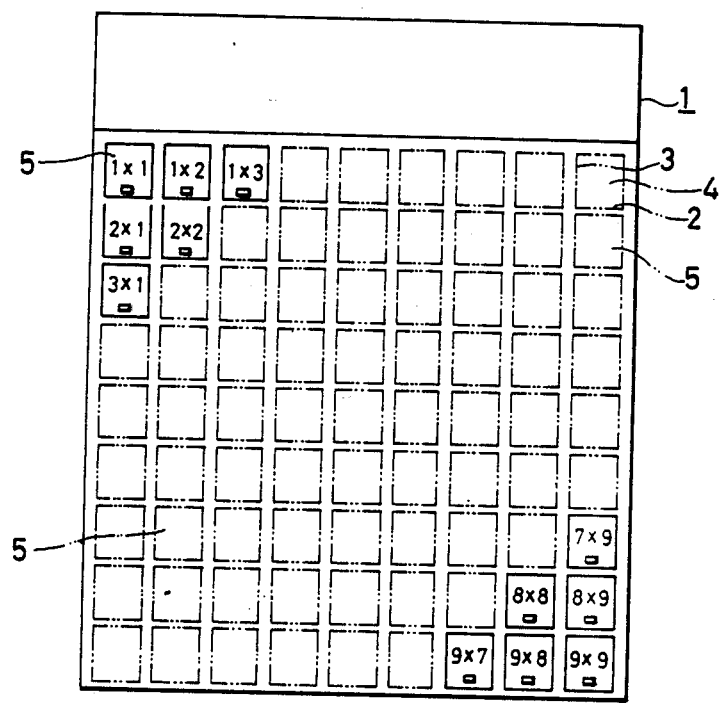
FIG. 1 is a plan view of a correct answer displaying device according to the invention.

A preferred embodiment of the invention will be described with reference to FIGS. 1 through 5.

Reference numeral 1 designates a practicing unit body having a frame 1 to 2 cm in thickness in which partition boards are arranged in matrix form to form square chambers 4 therein.

Reference numeral 5 designates a dark red-brown transparent plate placed over all the chambers. Multipliers and multiplicands are indicated on the front surface of the plate 5, while a black sheet or a paint layer in which correct answers, i.e., correct numbers 7, are formed by punching or other appropriate technique is provided on the rear surface of the plate 5.

The inner walls of each chamber are preferably painted black.

Reference numeral 10 designates white square plates. Each white square plate 10 has one side pivotally mounted on a shaft 11 provided for each row in such a manner that the square plate 10 is swingable in the respective chamber. An engaging step 14 is formed in the edge of the pivotally mounting part 12 of each white square plate 10.

Reference numeral 15 designates answer levers which are caused to pass in and out of the respective chambers. The upper end portion 16 of each answer lever serves as a depressing part which protrudes above the transparent plate and has a protrusion 17 at the middle which is engaged with the engaging step 14.

Reference numeral 18 designates restoring springs, and reference numeral 19 designates slide guide frames.

As is apparent from the above description, in the practicing unit thus constructed, a multiplier and a multiplicand are indicated for each chamber (block). When it is required to obtain the correct product thereof, the answering lever of the block is depressed. In this operation, the engaging protrusion 17 is engaged with the step 14 to turn the white square plate 10 about the shaft 11, i.e., to cause the white square plate 10 to contact or come near the rear surface of the colored transparent plate. As a result, the number, i.e., the correct answer which has been indicated in the form of a through-hole or through-holes, appears clearly in the colored transparent plate.

Figures 2A, 3A:
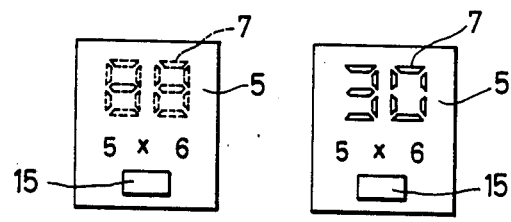
FIGS. 2A, 2B, 3A and 3B are plan views showing a way of displaying a correct answer on a colored transparent plate and white plates.
Figures 2B, 3B:
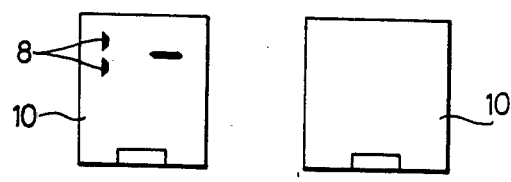
Figure 4:
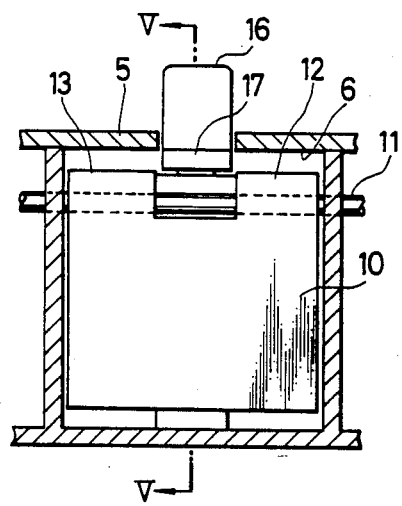
FIG. 4 is a sectional view of each chamber in the displaying device.
Figure 5:
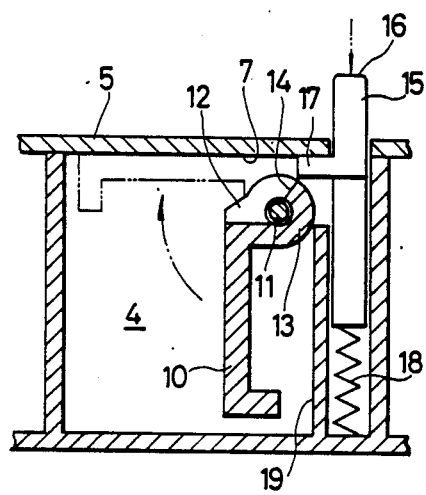
FIG. 5 is a sectional view taken along a line V—V in FIG. 3.

The correct answers, namely, the correct numbers displayed on the colored transparent plate, are optional in configuration. Different numbers may be provided for different blocks. For example, to display the correct answers on the colored transparent plate, as shown in FIG. 2A, a seven-segment pattern is displayed in all of the blocks, and the region or regions of the white plate 10 which correspond to the segments which are unnecessary for displaying the correct answer are painted black or in the same color as that of the colored plate.

After the correct answer is confirmed, the answer lever 15 is released. As a result, the answer lever 15 is restored by the restoring spring 18. Therefore, the white plate 10, being disengaged, swings downwardly under the force of gravity so that the correct answer cannot be observed any longer.

Figure 6:
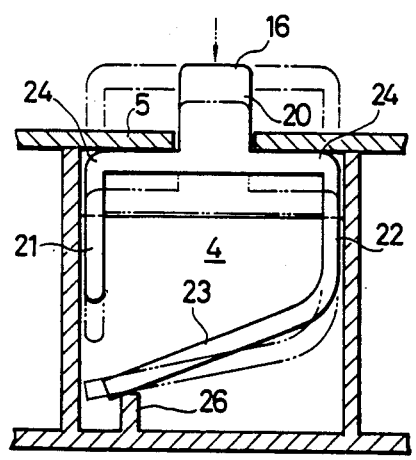
FIGS. 6 and 7 are sectional views showing another example of an answer lever shown in FIGS. 4 and 5.
Figure 7:
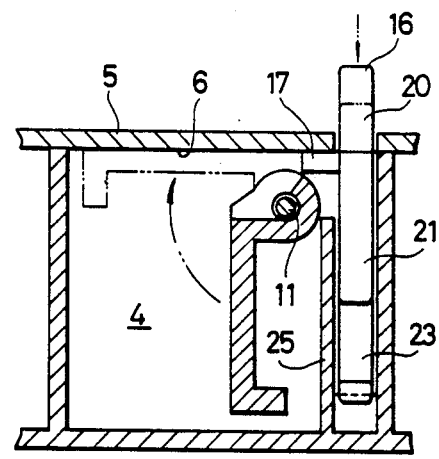

FIGS. 6 and 7 show another example of the answer lever. The answer lever 20 in this case is formed of an elastic plastic or metal plate in such a manner that it, except for its depressing part 16, is substantially U shaped and at least one end portion is inclined as indicated at 23 so that it acts as a spring.

This answer lever 20 is advantageous in that, as both side portion 21 and 22 are guided by two side walls of the chamber, two surfaces of the slide guide frame can be eliminated, that is, the answer lever 20 is guided merely by a guide wall 25. In addition, since the leaf spring 23 is a part of the answer lever 20, the leaf spring 23 is formed simultaneously with the answer lever 20. Furthermore, the shoulders 24 of the answer lever 20 abut against the lower surface of the colored transparent plate 5 to stably hold the answer lever 20.

If the answer lever 20 is modified so that the shoulders 24 protrude above the transparent plate, as indicated by the one-dot chain lines in FIG. 6, then the shoulders can be used as a depressing part.

A leaf spring supporting part 26 may be eliminated if desired.

The invention has been described with reference to a multiplication practicing unit; however, it goes without saying that the technical concept of the invention is applicable to a correct answer displaying device for an addition practicing unit, a subtraction practicing unit, or the like.

What is claimed is:

1. A correct answer displaying device for a calculation practicing unit comprising: chambers arranged in matrix form with partition boards, a colored transparent plate placed over said chambers on which a plurality of numbers to be calculated are indicated and through which configurations of correct answer numbers cannot be observed, a white plate for each chamber and answer levers operable for rectilinear motion disposed so as to be operable to cause said white plates to come near the lower surface of said colored transparent plate to display correct answers, each of said white plates having a side portion, said side portion having a longitudinal channel therein, and shaft means extending through said chamber and said channel for pivotally mounting said plate in said chamber, said side portion having a notched engaging step, and said answer levers each having a protrusion engageable with said notched step upon depressing said answer lever, and said chambers each having a guide slot configured to receive said answer lever.

2. The correct answer displaying device as claimed in claim 1, wherein said answer levers each include a restoring coil spring positioned in said guide slot to provide a restoring force on said lever when depressed.

3. The correct answer displaying device as claimed in claim 1, wherein said chamber includes parallel spaced sidewalls and said answer levers comprise a frame-shaped member having a tab portion extending through an aperture in said transparent plate and a first member extending horizontally from said tab portion, and terminating substantially at said sidewalls, said frame-shaped member further including second members extending vertically downward from the distal ends of said first member substantially parallel to said sidewalls, at least one of said second members having a portion inclined downwardly from said sidewall, said downwardly inclined portion acting as a leaf spring to bias said frame member relative to said chamber to provide a restoring force when said tab is depressed through said aperture to reveal said white plate.

4. A correct answer displaying device for a calculation practicing unit comprising: chambers arranged in matrix form with partition boards, a colored transparent plate placed over said chambers on which a plurality of numbers to be calculated are indicated and through which configurations of correct answer numbers cannot be observed, a contrasting colored plate for each chamber and answer levers operable for rectilinear motion disposed so as to be operable to cause respective contrasting colored plates to come near the lower surface of said colored transparent plate to display correct answers, each of said contrasting colored plates having a side portion, said side portion having a longitudinal channel therein, and shaft means extending through said chamber and said channel for pivotally mounting said plate in said chamber, said side portion having a notched engaging step, and said answer levers each having a protrusion engageable with said notched step upon depressing said answer lever, and said chambers each having a guide slot configured to receive said answer lever.

* * * * *